United States Patent [19]

Aoki

[11] 4,299,791

[45] Nov. 10, 1981

[54] METHOD FOR THE PREVENTION OF DROOLING FROM A PLASTIC INJECTION MOLDING MOLD AND INJECTION NOZZLES

[76] Inventor: Katashi Aoki, 6037, Ohaza Minamijo, Sakaki-machi, Hanishina-gun, Nagano-ken, Japan

[21] Appl. No.: 58,488

[22] Filed: Jul. 18, 1979

[51] Int. Cl.$^3$ .............................................. B29F 1/03
[52] U.S. Cl. ........................... 264/328.9; 264/328.11; 425/558; 425/568; 425/569
[58] Field of Search .............. 425/558, 563, 568, 569, 425/567; 264/328.9, 328.11

[56] References Cited

U.S. PATENT DOCUMENTS 3,339,239 9/1967 Peck ..................................... 425/563
3,934,626 1/1976 Hall .................................. 425/563 X

FOREIGN PATENT DOCUMENTS 767146 1/1957 United Kingdom ................ 425/569

Primary Examiner—Thomas P. Pavelko
Attorney, Agent, or Firm—Fulwider, Patton, Rieber, Lee & Utecht

[57] ABSTRACT

A method for the prevention of drooling from a plastic injection molding mold and injection nozzles. The method comprises the steps of varying a volume of a sprue in injection molding mold by movement of a plunger in a nozzle touch member inserted into the sprue, automatically returning the plunger previously moved by the nozzle touch force to its original position as the nozzle touch force decreases when the nozzle moves away after injection molding has been carried out, and increasing the sprue volume equal to an amount of movement thereof more than when injection is made to reduce the residual pressure to the extent that no drooling is introduced while maintaining said nozzle in contact with said nozzle receiver.

3 Claims, 5 Drawing Figures

4,299,791

METHOD FOR THE PREVENTION OF DROOLING FROM A PLASTIC INJECTION MOLDING MOLD AND INJECTION NOZZLES

BACKGROUND OF THE INVENTION

1. Field of the Invention

This invention relates to a method for the prevention of drooling from a sprue gate of injection molding mold and nozzles of injection apparatus.

2. Description of the Prior Art

When nozzles are moved away from the mold after injection molding has been carried out, trickles of plastic from the sprue gate occur. This trickle of plastic is generally called the drooling (trickling), which is said to be caused by residual pressure stored in the sprue and runner.

The drooling on the side of mold tends to occur when the hot runner is used to inject fused plastic into each of cavities, and for this reason, a needle valve is mounted on each nozzle connected to the hot runner. As a result, the drooling in each nozzle can be prevented but conversely the drooling in the sprue gate increases, as a consequence of which the trickled plastic sticks and/or burns to a peripheral portion of gate or to the nozzle tip of injection apparatus, resulting in a poor nozzle touch.

Similarly, even in the nozzles of injection apparatus, when the nozzles are moved away from the sprue gate after injection molding has been carried out, the drooling from the nozzle orifices occurs. This is said to be caused by residual pressure of fused plastic stored between the nozzle and the screw.

Means for preventing such drooling have been heretofore proposed, one of which is that a needle valve is provided within the nozzle, and the other being that a screw is forcibly withdrawn slightly to zero plastic pressure. However, in the former in which the needle valve is biased by a spring, the drooling may be prevented even when back pressure is applied, but high plastic pressure is required to open the valve during the process of injection, thus entailing a considerable resistance. As a consequence, it is not possible to make delicate adjustment during injection and filling processes important to molding and in addition there gives rise to new drawback that one gets burnt easily.

In the latter proposal in which the screw is withdrawn, if the forcible withdrawing stroke of screw is too long, the injection cylinder interiorly assumes a negative pressure so that the nozzle orifice draws air, which during next injection, is injected together with fused plastic into the mold, resulting in defective molded articles. Accordingly, the forcible withdrawing stroke of screw must be made accurately, but it is said to be extremely difficult to accurately control the withdrawal of screw within the range of several millimeters.

SUMMARY OF THE INVENTION

This invention prevents drooling in the abovementioned injection molding mold by providing a novel method which can reduce residual pressure in the sprue and hot runner which forms the cause of introducing drooling every time the nozzle moves away therefrom to prevent drooling from the sprue gate and which can prevent drooling also from the nozzle connected to the hot runner without use of needle valve.

More specifically, the present invention provides a method which comprises varying a volume of a sprue in injection molding mold by movement of a plunger in a nozzle touch member inserted into the sprue, automatically returning the plunger previously moved by the nozzle touch force to its original position as the nozzle touch force decreases when the nozzle moves away after injection molding has been carried out, and increasing the sprue volume equal to an amount of movement thereof more than when injection is made to reduce the residual pressure to the extent that drooling does not occur.

The method in accordance with the present invention may vary the volume of sprue connected to the hot runner with every injection molding, remove the residual pressure of fused plastic produced after injection molding, and prevent drooling in the mold using the hot runner, and accordingly, there occurs no drooling despite continuous molding for a long period of time and always provides good nozzle touching.

Differently from the case in which a valve is used to prevent leakage, the hot runner and sprue are not suffered from an obstacle to flow, and thus the present invention offers advantages that the flow is smooth and that one will not get burnt due to an accumulation of fused plastic. In construction, it is so simple that the plunger of the nozzle touch member merely need be inserted into the sprue slidably, and it is so set that the nozzle touch members may be alternately moved by the returning spring and the nozzle touch force and other special means can be eliminated. This brings forth advantages that there occurs no failure and that reliable operation may be achieved in accordance with movement of injection apparatus.

The present invention further provides a novel method which can fully prevent drooling even on the nozzle side of injection apparatus without a considerable modification of main structure of the nozzle.

That is, in accordance with the present method, the nozzle head is relatively movably inserted by the external force into the foremost end of a nozzle body secured to the injection cylinder, said nozzle head being biased outwardly, and a movable space formed within the nozzle head is used for the plastic pressure reduced portion formed when the nozzle is moved away from the mold so as to prevent drooling of plastic due to residual pressure.

As described above, in accordance with the present invention, the nozzle body and the nozzle head at the foremost end thereof are designed to be moved relatively by the external force, and the movable space within the nozzle head is used for a portion to remove plastic pressure so as to prevent drooling. Thus, higher effect than conventional means can be achieved. In addition, since pressure reducing function is carried out in a state wherein the nozzle touch is maintained, no air is drawn. Moreover, since a specific valve need not be provided on the foremost end of the nozzle, there brings forth an advantage that it is possible to readily set a delicate condition important to molding process.

BRIEF DESCRIPTION OF THE DRAWINGS

FIGS. 1 and 2 show a first embodiment of assistance in explaining the method for the prevention of drooling in an injection molding mold, in which FIG. 1 is a longitudinal sectional view of a runner block and a foremost end of injection apparatus in a state where the injection nozzle is moved away from the nozzle touch member, and FIG. 2 is a longitudinal sectional view of the runner block and the foremost end of injection apparatus; and FIGS. 3 through 5 show a second embodiment of assistance in explaining the method for the prevention of drooling on the side of injection nozzle, in which FIG. 3 is a longitudinal sectional view of a sprue gate portion of injection mold and the foremost end of injection apparatus in a state prior to the nozzle touch, FIG. 4 is a longitudinal sectional view in a state where injecting begins after the nozzle touch, and FIG. 5 is a longitudinal sectional view in a state where injecting is completed and injection nozzle begins to move.

DESCRIPTION OF THE PREFERRED EMBODIMENTS

Figure 1:
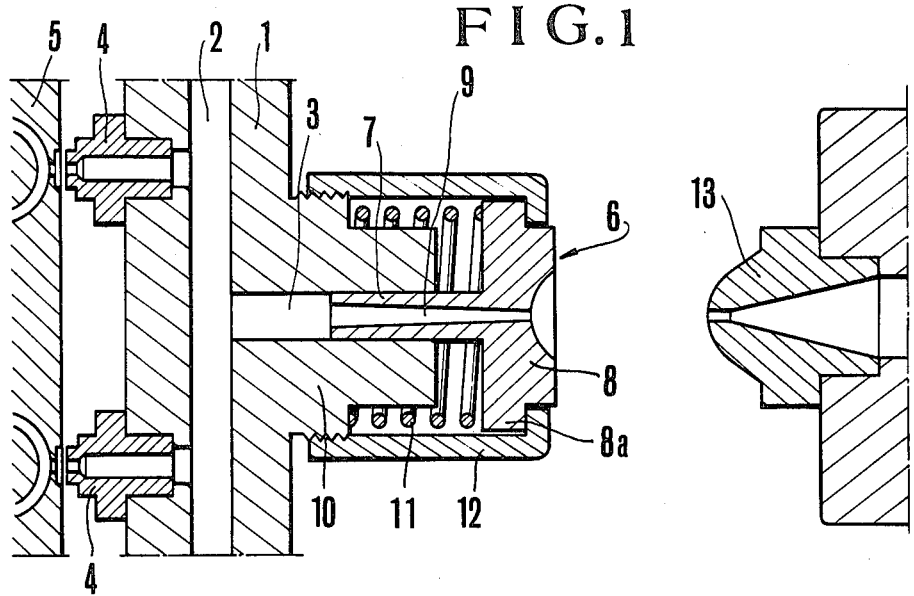

Referring now to the figures, there is shown a runner block of an injection molding mold at 1 within which a hot runner 2 and a sprue 3 are positioned, the hot runner 2 having a plurality of nozzles 4, 4 mounted opposedly to gates of cavities 5.

A nozzle touch member indicated at 6 has a T-shape integrally formed with a plunger 7 slidably inserted into the sprue 3 and a nozzle receiver 8 and has a flow passage 9 for the fused plastic bored in the middle thereof, the flow passage having its outer end which constitutes a gate. Between a flange 8a formed in the periphery of the nozzle receiver 8 and a receiving member 10 in the periphery of the sprue protruded from the runner block 1 there is interposed a returning spring 11 for always outwardly biasing the nozzle touch member 6. Screwed into a peripheral portion of a threaded base of the receiving member 10 is a cylindrical holder 12 for preventing the nozzle touch member 6 from being disengaged from the mold by engagement with the flange 8a. The holder 12 can be screwed and unscrewed to adjust a position of the plunger 7 inserted into the sprue 3.

Figure 2:
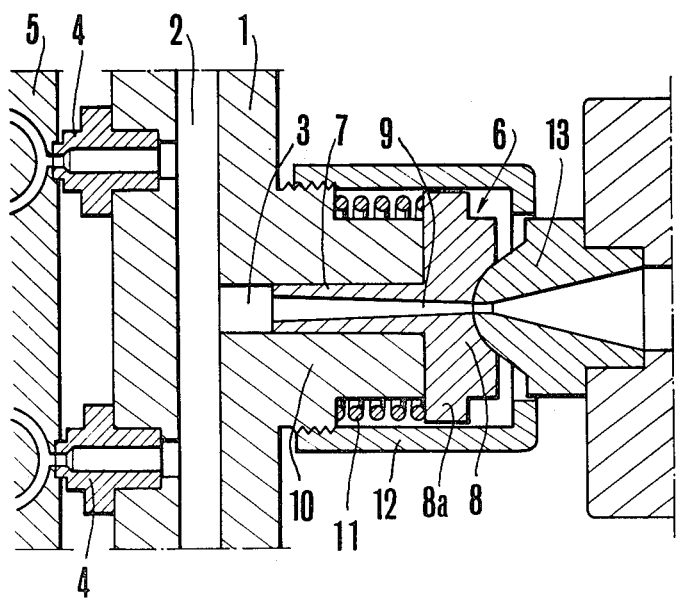

With the construction as described above, when the injection apparatus is moved forward, in order to effect injection molding from the FIG. 1 position, to permit the tip of the nozzle 13 to touch the nozzle touch member 6, the nozzle touch member 6 is inwardly forced by the touch force against the returning spring 11 and the plunger 7 is moved deep into the sprue 3 as shown in FIG. 2.

When the injection apparatus is returned to its original position in FIG. 1 after the cavities 5 have been filled with fused plastic, the biasing force against the nozzle touch member 6 decreases as the nozzle 13 moves. As this biasing force decreases, the nozzle touch member 6 is returned to its original position by the spring pressure. Thus, the plunger 7 is also returned to its original position in FIG. 1. As a result, the volume of the sprue 3 increases more than when injection is made, and the residual pressure of fused plastic in the hot runner 2 and sprue 3 is reduced equally to the volume for removal, as a consequence of which the fused plastic which trickles externally of the nozzles 4 and sprue gate almost disappears, and no drooling occurs.

Figure 3:
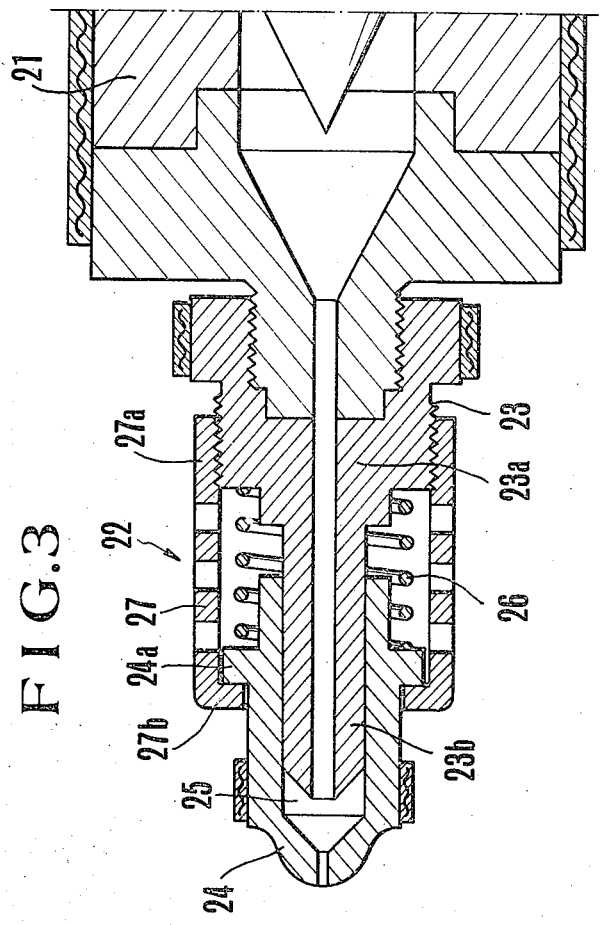
Figure 3:
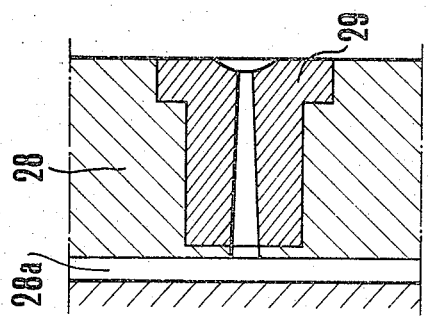
Figure 4:
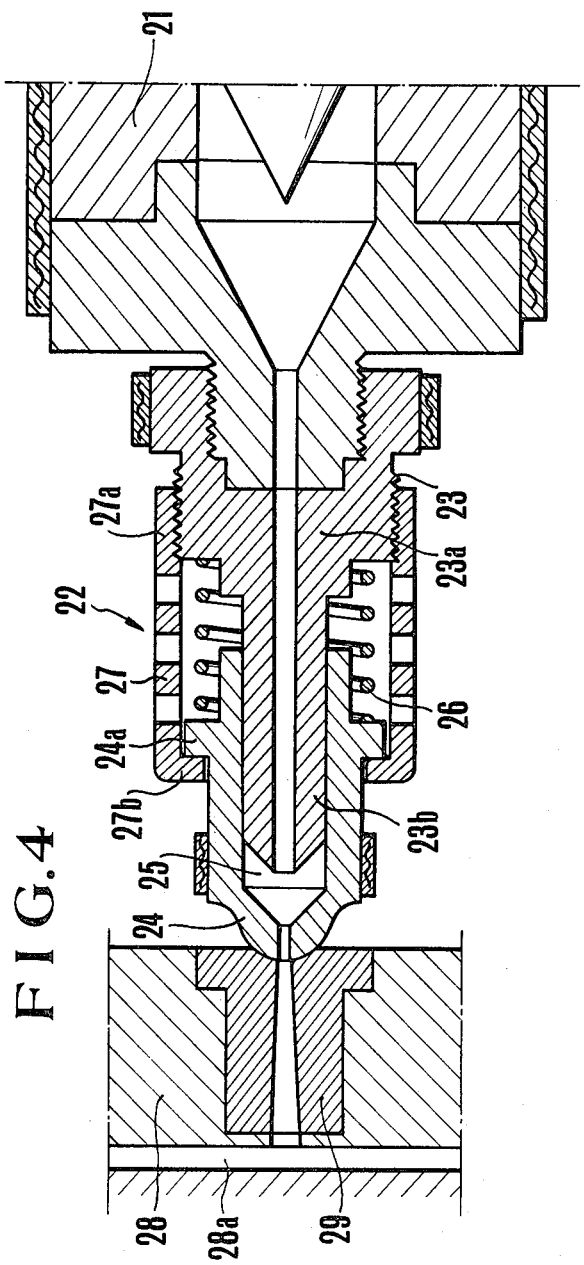
Figure 5:
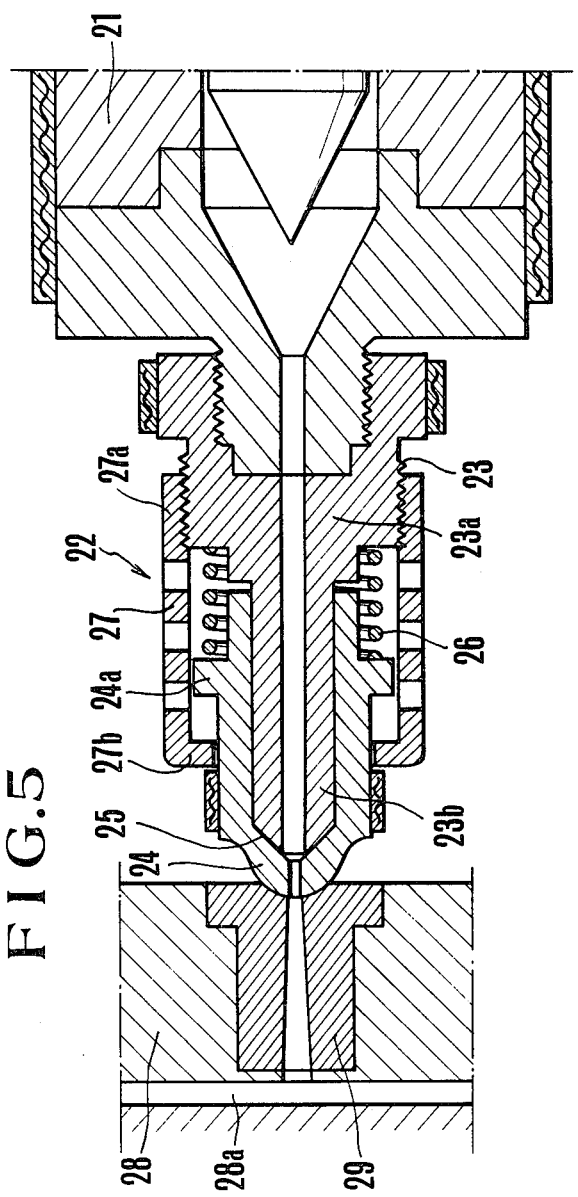

In the embodiment shown in FIGS. 3 through 5, the reference numeral 21 designates an injection cylinder, and 22 a nozzle comprising a nozzle body 23 mounted on the injection cylinder 21 and a head 24 at the foremost end thereof.

The nozzle body 23 comprises a cylindrical body 23b of required length extended from the central portion of a base 23a, and the cylindrical body 23b has a movable space 25 at the foremost end thereof to slidably receive a nozzle head 24 therein. Between a flange 24a formed in the outer periphery of the nozzle head 24 and the base 23a there is interposed a returning coiled spring 26 for always outwardly biasing the nozzle head 24, whereby the nozzle head 24 and the body 23 may be relatively moved by the external force.

A bended end 27b of a stopper 27 having a rear end 27a threadably secured to the base 23a bears on the outside of the flange 24a. The bended end 27b is provided to prevent the nozzle head 24 from being disengaged from the foremost end of the cylindrical body 23b, and the rear end 27a can be screwed and unscrewed to adjust the moving stroke of the nozzle head 24, thereby varying the volume of a pressure removing portion by the movable space 25.

In the above-described embodiment, when the injection cylinder 21 is moved forward, the nozzle head 24 first touches a sprue bush 29 of a mold 28 as shown in FIG. 4. However, in this state, since the movable space 25 and a space between the rear end of the nozzle head and the base 23a are present, the cylindrical body 23b moves while compressing the coiled spring 26 to a point where either of space is lost and thus assumes a state shown in FIG. 5.

Next, when the injection cylinder 21 is moved back after the mold 28 has been filled with plastic, the body side first begins to move in a state where the nozzle touch is maintained since the nozzle head 24 is placed in pressure contact with the sprue bush 29 by means of the coiled spring 26, and the nozzle head is again interiorly formed with a pressure removing portion by the movable space 25 to reduce the residual pressure of plastic in the nozzle tip to a level in the vicinity of zero, in a manner similar to the case of FIG. 3.

That is, the plastic within the nozzle flows into the movable space 25, which gradually increases in volume as the cylindrical body 23b moves, and the residual pressure reduces through a portion equal to the aforesaid flow-in.

The reduction in the residual pressure is in proportion to the volume, and the operation is continuously carried out in a manner that the nozzle body 23 is fully withdrawn together with the injection cylinder 21, the bended end 27b of the stopper 27 again comes into contact with the flange 24a, and the nozzle head 24 is withdrawn together with the nozzle body. Thus, not only the plastic within the nozzles but also the plastic in the hot runner 28a of the mold 28 are drawn and even the residual pressure within the hot runner is also removed, according to the volume of the pressure removing portion by the movable space 25, as a consequence of which no drooling occurs even from the sprue of the mold, not to mention from the nozzle tip away from the mold.

What is claimed is:

1. A method for the prevention of drooling from a plastic injection molding mold in which a nozzle is arranged to impose a touching force on a nozzle receiver on said mold during injection of plastic, and said nozzle is arranged to remove said touching force after injection of said plastic; said method comprising:
   providing a space having a variable volume within said mold adjacent said nozzle receiver;
   decreasing the volume of said space in response to the imposition of said touching force; and
   increasing the volume of said space in response to the removal of said touching force;
   said method further characterized in that a plunger of a nozzle touch member provided with a flow passage is slidably inserted into a sprue connected to the hot runner in the injection molding mold, said plunger being always biased outwardly by means of the return spring so that the plunger may be moved inwardly by means of an external force, and after said plunger has been moved inwardly by the nozzle touch for injection molding, the plunger is automatically returned to its original position as the touch force decreases due to the separation of the nozzle to increase the volume of sprue so that the residual pressure of the sprue and hot runner is reduced to the extent that no drooling is introduced.

2. A method for the prevention of drooling from a plastic injection molding mold and injection nozzle in which said nozzle is arranged to impose a touching force on a nozzle receiver on said mold during injection of plastic, and said nozzle is arranged to remove said touching force after injection of said plastic; said method comprising:

providing a space having a variable volume within said mold adjacent said nozzle receiver;

decreasing the volume of said space in response to the imposition of said touching force; and increasing the volume of said space in response to the removal of said touching force while maintaining said nozzle in contract with said nozzle receiver.

3. The method for the prevention of drooling from a plastic injection molding mold and injection nozzles as claimed in claim 2 characterized in that a plunger of a nozzle touch member provided with a flow passage is slidably inserted into a sprue connected to the hot runner in the injection molding mold, said plunger being always biased outwardly by means of the return spring so that the plunger may be moved inwardly by means of an external force, and after said plunger has been moved inwardly by the nozzle touch for injection molding, the plunger is automatically returned to its original position as the touch force decreases due to the separation of the nozzle to increase the volume of sprue so that the residual pressure of the sprue and hot runner is reduced to the extent that no drooling is introduced.

* * * * *